United States Patent Office 2,776,921
Patented Jan. 8, 1957

2,776,921

UNSATURATED ALKYLPHENONE INSECTICIDES FOR SOFT-BODIED INSECTS

Sidney Melamed, Philadelphia, Pa., assignor to Rohm & Haas Company, Philadelphia, Pa., a corporation of Delaware No Drawing. Application January 23, 1953,
Serial No. 332,997

12 Claims. (Cl. 167—30)

This invention concerns alkylphenones of the structure

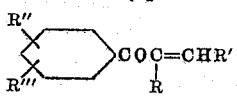

wherein R represents hydrogen, chlorine, or the methyl group, R' represents hydrogen or the methyl group, R'' represents hydrogen or an alkyl group of one to four carbon atoms, R''' represents an alkyl group of three to fifteen carbon atoms with the limitation that the sum of carbon atoms in R'' and R''' must be at least four and is preferably not over sixteen. These compounds are useful as pesticidal agents for control of pests on living plants. They are particularly effective against scale insects, aphids, mites, spiders, and thrips. They also act as ovicides.

The utility and action of the compounds of this invention are in strange contrast with those of crotonylbenzene and its methyl and chloro derivatives. None of these is an effective toxicant; also these materials are markedly phytotoxic. It has been found, however, that when the phenyl group of the above phenones contains one or more alkyl groups of sufficient size, the resulting new compounds are surprisingly effective as contact agents. Hence, this invention includes the process of controlling soft bodied insects and arachnids on living plants by applying thereto a composition comprising at least one of the above defined compounds dispersed in a carrier.

The phenones of this invention are prepared by reacting by condensing an alkylbenzene

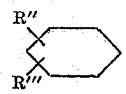

and an unsaturated acyl halide

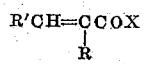

wherein X is chlorine or bromine, the R substituents having the meanings stated above. There may likewise be used corresponding acid anhydrides. The condensation is effected between about −20° C. and 40° C. with the aid of a Friedel-Crafts condensing agent. The agent is most conveniently aluminum chloride, in an amount at least equivalent to the unsaturated acyl halide. In place of aluminum chloride there may be used aluminum bromide, zinc chloride, ferric chloride, boron trifluoride, stannic chloride, or the like. The reaction is best effected in the presence of an inert organic solvent, carbon bisulfide, tetrachloroethane, nitrobenzene, ligroin and mixtures of these solvents being particularly suitable for this purpose. The complex which results from bringing together alkylbenzene, acyl halide, and catalyst is decomposed with ice or with ice and water or, when a metal halide is used as catalyst, best with ice and hydrochloric acid. The product then separates. It is washed and usually distilled.

The alkylbenzene must have an alkyl group or alkyl groups totaling at least four carbon atoms, there being not less than three carbon atoms in any single alkyl group. A single ring substituent can be as small as butyl, but if a methyl group is present in the benzene ring, then there may be an alkyl group as small as three carbon atoms. There may be as many as fifteen carbon atoms in one alkyl group attached to the phenyl ring. When two alkyl groups are present, their relative position is not a controlling or critical factor.

The acyl halide may be crotonyl chloride, crotonyl bromide, acrylyl chloride or bromide, α-chloroacrylyl chloride, or α-methacrylyl chloride or bromide.

Typical examples showing preparation of phenones of this invention follow. Parts are by weight.

Example 1

A solution was made from 134 parts of tert.-butylbenzene and 500 parts of carbon bisulfide. To this was added 134 parts of aluminum chloride. There was then slowly added crotonyl chloride in a total of 105 parts, while the temperature of the reaction mixture was held at about 25° C. The reaction mixture was left standing for 16 hours and poured onto crushed ice which had been treated with 250 parts of concentrated hydrochloric acid. An organic layer formed. It was separated and washed with water, with cold aqueous 5% sodium hydroxide solution, and again with water. The washed product was distilled. The fraction taken at 118°–123° C./1 mm. corresponded in composition to tert.-butylcrotonophenone. This fraction amounted to 110 parts. By analysis it contained 82.9% of carbon and 9.6% of hydrogen. Theoretical values are 83.1% and 9.0%, respectively.

This compound was used as the toxicant in an insecticidal composition comprising one part of the compound, two parts of methylated naphthalenes, and one part of non-ionic emulsifier. One part of this composition was diluted with one hundred parts of water and a spray of the resulting emulsion was applied to bean plants infested with aphids. A count was made 24 hours later. There was obtained a kill of 82%.

The spray was also applied to plants infested with the milkweed bug. A kill of 80% resulted in 24 hours.

Against green-house thrips a kill of 100% was obtained with a 1% emulsion of the above compound and a kill of 100% was obtained in tests with citrus red mites on grape fruit.

The identical type of spray made from crotonophenone failed to give kills against the above insects. Crotonophenone was tested, for example, in the same way as the above compound against aphids and red spiders with 0% mortalities.

Example 2

In the same way there are reacted 162 parts of di(isopropyl)benzene and 105 parts of crotonyl chloride in carbon bisulfide with 134 parts of aluminum chloride. The fraction obtained at 144°–150° C./2 mm. is the desired product, di(isopropyl)crotonophenone. The yield is 55%. By analysis the product contains 82.7% of carbon and 9.4% of hydrogen. Theoretical values are 83.4% and 9.6%, respectively.

This compound has the formula

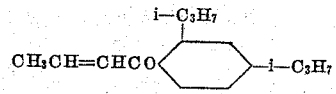

In tests against aphids on bean plants this compound gave a kill of 91% at a dilution of 1 to 400 and a kill of 82% at a dilution of 1 to 800. This compound at a dilution of 1 to 400 gave an 80% kill of citrus red mites on grape fruit.

Example 3

In the same way as above there were reacted di(tert.-butyl)benzene, crotonyl chloride, and aluminum chloride, all in molar proportions. The product distilled at 120°–125° C./2 mm. It contained 82.5% of carbon and 9.2% of hydrogen and corresponds in composition to

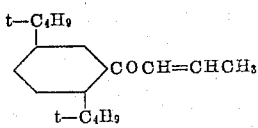

This compound was tested against red spiders on oranges. It gave a 99% kill at a dilution of 1 to 400.

*Example 4*

In the same way there was reacted octylbenzene, crotonyl chloride, and aluminum chloride. The product, octylcrotonophenone, was collected at 165°–170° C./1 mm.

In tests against black bean aphids on bean plants it gave a kill of 96% at a dilution of 1 to 400 and a kill of 92% at a dilution of 1 to 800. At a dilution of 1 to 100 it gave a kill of 100% of mites on citrus. This compound was examined for its ovicidal action. It gave a kill of 90% of citrus red mite eggs at a dilution of 1 to 400. This compound also gave a 99% control of Citricola scale when applied at a dilution of 1 to 400.

*Example 5*

In the same way there were reacted molar proportions of 4-dodecyltoluene, crotonyl chloride, and aluminum chloride in carbon bisulfide as solvent. The product was fractionally distilled. At 170°–183° C./1 mm. there was obtained the compound

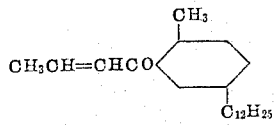

The product as obtained contained 83.9% of carbon and 10.7% of hydrogen. Theoretical values are 84.2% and 11.2%, respectively.

Against black bean aphids on bean plants this compound gave a kill of 80% at a dilution of 1 to 400. It gave a kill of 92% of California red scale at a dilution of 1 to 400. Against Citricola scale it gave a 75% control at a dilution of 1 to 400.

*Example 6*

There were mixed 2240 parts of sym-tetrachloroethane and 555 parts of crotonyl chloride. The mixture was cooled to −10° C. in a bath at −23° C. composed of dry ice, isopropanol, and water. Thereto was added aluminum chloride in an amount of 755 parts. There was slowly added octylbenzene to a total of 855 parts, while the temperature of the mixture was held between −15° and −8° C. The mixture was brought to +5° C. over a two hour period and poured onto 7000 parts of crushed ice containing 250 parts of concentrated hydrochloric acid. This mixture was stirred and then allowed to separate. The aqueous layer was extracted with 1200 parts of tetrachloroethane and the extract was combined with the organic layer. The combined solution was washed three times with water, three times with aqueous 10% sodium hydroxde solution, and two times with water. The organic solution was then distilled, the desired octylcrotonophenone being taken off at 180°–200° C./1.5 mm. in a 48% yield.

This product gave a 10% kill of mites when used in an emulsion concentrate and diluted 1:100. It gave a 99% kill of aphids at a dilution of 1:400.

*Example 7*

In accordance with the procedure of Example 6 there are brought together 35 parts of acrylic anhydride, which acts essentially like the chloride, and 50 parts of nonyltoluene in the presence of sym.-tetrachloroethane and 73 parts of aluminum chloride. After the steps of decomposition on ice and removal of the organic layer acrylyl nonyltoluene is obtained on distilling, coming over at 145°–165° C./0.5 mm. It has a refractive index, $n^{20}_D$, of 1.5230. On analysis it gives a bromine number of 57, the theoretical number being 59.

Against the black bean aphid this compound gave a kill of 89% when applied in a spray at 1 to 400 and of 83% when applied at 1 to 800. It was not phytotoxic to tomatoes, beans, or sweet potatoes at these dilutions.

This lack of phytotoxicity is in marked contrast to the effect of methylcrotonophenone or acrylyl toluene which are definitely phytocidal to these same plants at the above dilutions.

The above compound killed 99% of citrus red mite eggs, the compound being applied in a 1 to 400 dilution. In contrast to this methylcrotonophenone had too little ovicidal action to be considered.

*Example 8*

From 30 parts of methacrylyl chloride and 50 parts of nonyltoluene there is obtained methacrylyl nonyltoluene, distilling at 137°–180° C./0.2 mm. This compound has a refractive index of 1.5190 at 20° C. The product as distilled has a bromine number of 55 (theory 56).

This compound gave a kill of 87% of black bean aphids when applied in an insecticidal spray at 1 to 400. Against citrus red mite eggs it gave a kill of 90% at this same dilution. When this spray was applied to tomato, bean, and sweet potato plants, there were no phytotoxic effects observed.

*Example 9*

From 30 parts of α-chlorocrotonyl chloride and 50 parts of nonyltoluene there is obtained in the same way α-chlorocrotonophenone. This distills at 163°–200° C./0.2 mm. It has a refractive index at 27° C. of 1.5346. The compound as prepared has a chlorine content of 11.7% (theory 11.1%).

A spray containing this compound in an emulsion at a dilution of 1:800 gave a kill of red spiders of 100%. Against citrus red mites this compound gives a kill of 90%.

A self-emulsifying concentrate is prepared from 25 parts of one of the compounds of this invention, 6 parts of mixed alkylphenoxypolyethoxyethanols, and 69 parts of methylated naphthalenes. This concentrate may be added to water and stirred therewith to give useful sprays for controlling insects attacked through their surfaces.

A wettable powder is prepared by mixing 25 parts of a compound of this invention with 25 parts of an adsorptive clay, 2 parts of a condensed naphthalene sulfonate, 2 parts of an alkylphenoxypolyethoxyethanol, and 46 parts of an inert finely divided solid, such as a soft kaolin. This preparation may be used in water and the aqueous dispersion applied as a spray. It may also be diluted with a finely divided solid diluent, such as clay, pyrophillite, talc, and the like or mixtures of such carriers to give a dust. A useful concentration of toxicant in such a dust is 5%.

I claim:

1. The process of controlling soft bodied insects on plants which comprises applying thereto a composition comprising an alkylphenone of the structure

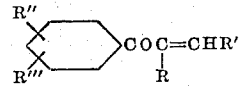

wherein R is a member of the class consisting of hydrogen, chlorine, and the methyl group, R' represents a member of the class consisting of hydrogen and the methyl group, R'' represents a member of the class consisting of hydrogen and alkyl groups of one to four carbon atoms, and R''' represents an alkyl group of three to fifteen carbon atoms, the sum of carbon atoms in R'' and R''' being at least four and not over sixteen, said alkylphenone being dispersed in a carrier therefor.

2. The process of controlling soft bodied insects on plants which comprises applying thereto a composition comprising an alkylphenone of the structure

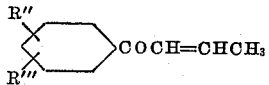

wherein R″ is a member of the class consisting of hydrogen and alkyl groups of not over four carbon atoms and R‴ is an alkyl group of three to fifteen carbon atoms, R″ and R‴ together containing at least four carbon atoms and not over sixteen carbon atoms, said alkylphenone being dispersed in a carrier therefor.

3. Alkylphenones of the structure

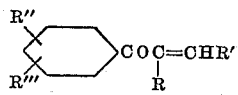

wherein R is a member of the class consisting of hydrogen, chlorine, and the methyl group, R′ represents a member of the class consisting of hydrogen and the methyl group, R″ represents a member of the class consisting of hydrogen and alkyl groups of one to four carbon atoms, and R‴ represents an alkyl group of three to fifteen carbon atoms, the sum of carbon atoms in R″ and R‴ being at least four and not over sixteen.

4. Alkylcrotonophenones having from four to sixteen carbon atoms in the alkyl portion thereof, there being at least one alkyl group of at least three carbon atoms.

5. Compounds of the formula

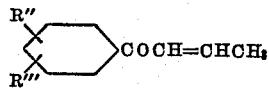

wherein R″ is a member of the class consisting of hydrogen and alkyl groups of one to four carbon atoms and R‴ is an alkyl group of three to fifteen carbon atoms, R″ and R‴ together containing at least four carbon atoms and not over sixteen carbon atoms.

6. As a new compound, tert.-butylcrotonophenone.
7. As a new compound, di(tert.-butyl)crotonophenone.
8. As a new compound, octylcrotonophenone.
9. Compounds of the formula

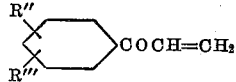

wherein R″ is a member of the class consisting of hydrogen and alkyl groups of not over four carbon atoms and R‴ is an alkyl group of three to fifteen carbon atoms, R″ and R‴ together containing at least four carbon atoms and not over sixteen carbon atoms.

10. As a new compound, acrylyl nonyltoluene.
11. Compounds of the formula

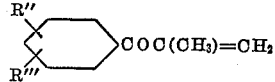

wherein R″ is a member of the class consisting of hydrogen and alkyl groups of not over four carbon atoms and R‴ is an alkyl group of three to fifteen carbon atoms, R″ and R‴ together containing at least four carbon atoms and not over sixteen carbon atoms.

12. As a new compound, methacrylyl nonyltoluene.

References Cited in the file of this patent

UNITED STATES PATENTS

| | | |
|---|---|---|
| 2,540,267 | Kress | Feb. 6, 1951 |
| 2,554,947 | Joos | May 29, 1951 |
| 2,587,540 | Shaver | Feb. 26, 1952 |

FOREIGN PATENTS

| | | |
|---|---|---|
| 515,110 | Germany | Jan. 15, 1931 |